(12) United States Patent
Jones

(10) Patent No.: US 7,292,420 B2
(45) Date of Patent: Nov. 6, 2007

(54) APPARATUS FOR IMPROVED GROUND FAULT EQUIPMENT PROTECTION

(75) Inventor: Thaddeus M. Jones, Breman, IN (US)

(73) Assignee: Msx, Incorporated, South Bend, IN (US)

( * ) Notice: Subject to any disclaimer, the term of this patent is extended or adjusted under 35 U.S.C. 154(b) by 158 days.

(21) Appl. No.: 10/984,219

(22) Filed: Nov. 9, 2004

(65) Prior Publication Data

US 2006/0098360 A1    May 11, 2006

(51) Int. Cl.
*H02H 3/00* (2006.01)
(52) U.S. Cl. ....................................................... 361/42
(58) Field of Classification Search .................. 361/42, 361/45, 47
See application file for complete search history.

(56) References Cited

U.S. PATENT DOCUMENTS 6,459,269 B1* 10/2002 Jones ........................ 324/509
2004/0252425 A1* 12/2004 Baldwin et al. .............. 361/42

* cited by examiner

*Primary Examiner*—Ronald W. Leja
(74) *Attorney, Agent, or Firm*—Taylor & Aust, P.C.

(57) ABSTRACT

A ground fault interrupter, including a current difference sensor and a current generator electrically coupled to the current difference sensor. The current generator provides a predetermined difference current to the current difference sensor. At least one contactor is electrically coupled to the current difference sensor. A controller is electrically coupled to the current difference sensor, the current generator and at least one contactor. The controller operates at least one contactor.

4 Claims, 5 Drawing Sheets

APPARATUS FOR IMPROVED GROUND FAULT EQUIPMENT PROTECTION

BACKGROUND OF THE INVENTION

1. Field of the Invention

The present invention relates to ground fault equipment protection, and, more particularly, to ground fault circuit interrupters.

2. Description of the Related Art

Ground fault circuit interrupters (GFCI, also known as a ground fault interrupter or GFI) are designed to protect from electrical shock by interrupting a circuit when there is a difference in the currents in the hot and neutral wires. Such a difference indicates that an faulty diversion of current from the wires is occurring, for example, a leakage current to ground from the hot wire. Such a current might be flowing in the ground wire, such as a leakage current from a motor or from capacitors. More importantly, the current diversion may occur because a person has come into contact with the hot wire and is being shocked. When a circuit is functioning normally, all the return current from an electrical load flows through the neutral wire, so the presence of a difference between hot and neutral currents represents a malfunction which in some circumstances can produce a damaging, dangerous or even lethal shock hazard.

Ground fault circuit interrupters are generally required by the electrical code for receptacles in bathrooms, some kitchen receptacles, some outside receptacles, and receptacles near swimming pools. Scenarios which led to these code requirements include dropping a hair dryer or a portable radio into a bathtub with a person, while the appliance is still connected to a source of electrical power, causing electrocution of the person. A typical circuit breaker interrupts the circuit at 20 amperes (A), but it takes only about 100 milliamperes (mA) or less to electrocute a person in such a scenario. A household ground fault circuit interrupter is designed to detect currents of a few milliamperes and trip a circuit breaker at the receptacle or at the circuit breaker panel to remove the shock hazard. Industrial applications can include greater voltages and/or currents which can be an even greater shock or fire hazard.

A ground fault circuit interrupter can have a "Test" button which causes a small difference between hot and neutral currents to test the ground fault circuit interrupter. For example, the test button can apply the 120 volt AC (alternating current) supply across a 14.75 kilo-ohm (kΩ) resistor, producing a current of 8 mA where, for example, a requirement for a ground fault circuit interrupter can be that it trip when there is 6 mA of leakage current, and more specifically, the ground fault circuit interrupter de-energizes a circuit within an established period of time (25 milliseconds) when a current to ground (ground-fault leakage) exceeds some predetermined value (6 mA, for Class A GFCI) which is far less than that required to operate the overcurrent (overload) protection device (breaker or fuse) of the supply circuit. The ground fault circuit interrupter can also include a reset button to use after it has been tripped.

An example of a ground fault circuit interrupter circuit construction is hot and neutral wires are passed through a sensing coil so that the currents in the two wires at any instant are traveling in opposite directions, giving a net zero current in the coil if the two currents are equal. Since a current carrying wire produces an AC magnetic field external to the wire, a non-zero current induces a voltage in the sensing coil. The sensing coil can be wound longitudinally to capture more of the wire's magnetic field and therefore can be a more sensitive net current detector. The current difference that is detected is relatively small. The ground fault circuit interrupter circuit can be designed to trip when there is more than 6 mA of leakage current out of the normal pathway. For example, the neutral return has 6 mA less current than the hot wire, out of up to a 20 A load. The voltage in the sensor coil is rectified and applied to the input of a sensitive comparator. The comparator activates a trip coil which opens both the hot and neutral wires thereby interrupting the circuit. If all circuits were wired with correct polarity, opening the hot wire is sufficient, but since it is not uncommon for the circuits to be accidentally wired backward, it is prudent to interrupt both hot and neutral wires.

Because of the sensitivity of the detection of current differences, GFCIs are prone to nuisance tripping in certain applications. Further, a single GFCI can be used to protect several circuits. Unfortunately, GFCIs can be disconnected to eliminate the nuisance tripping, and thereby eliminate ground fault protection for one or more circuits.

Additionally, a ground fault circuit interrupter can fail in a way that permits the device to be reset and pass current without providing ground fault protection. Many people do not understand how a GFCI works and hence may believe that protection is being provided when, in fact, the device has failed. An article in IAEI News (International Association of Electrical Inspectors) has reported a high failure rate of GFCIs. The protective circuitry in a GFCI is vulnerable to voltage spikes such as those caused by lightning and high-voltage switching. It is possible for the GFCI to eventually fail to provide ground fault protection while still providing power for equipment, tools and appliances. A proper test sequence can help assure that the GFCI is still providing ground fault protection; however, such a test sequence is operator dependent.

In general, GFCI protection equipment is subject to undetected failures that inhibit their function. Random component failures caused by lightning and other electrical surges, abuse, along with normal wear and tear, all can cause component failures that can render a GFCI inoperable and thus incapable of performing its safety function. This is particularly true in freeze protection application where equipment may be unused other than during the winter months. For example, in pipe heater trace freeze protection and similar applications, the pipe heater trace equipment is typically unused in the warm months. During these warm months, maintenance of piping and accessories such as valve seals can damage the heating cable. Additionally, a lightning strike can damage a GFCI for the heater trace equipment. When the heater trace equipment is operated for the first time in the cold months, due to the inadvertent damage to the equipment caused by maintenance and/or the lack of ground fault protection due to the lightning strike, a shock and/or fire hazard can exist.

What is needed in the art is an apparatus and method for automatically monitoring ground fault apparatus.

SUMMARY OF THE INVENTION

The present invention provides an apparatus and method for automatically monitoring ground fault apparatus, and disabling the ground fault apparatus and associated circuitry if the ground fault apparatus is determined to be defective.

The invention comprises, in one form thereof, a ground fault interrupter, including a current difference sensor and a current generator electrically coupled to the current difference sensor. The current generator provides a predetermined difference current to the current difference sensor. At least one contactor is electrically coupled to the current difference sensor. A controller is electrically coupled to the current difference sensor, the current generator and at least one contactor. The controller operates at least one contactor.

In another form thereof, the invention comprises an electrical system for connection to a source of electrical power, comprising: an electrical load and a ground fault interrupter electrically coupled to the electrical load. The ground fault interrupter is configured for connection to the source of electrical power. The ground fault interrupter includes a current difference sensor and a current generator electrically coupled to the current difference sensor. The current generator provides a predetermined difference current to the current difference sensor. At least one contactor is electrically coupled to the current difference sensor and the electrical load. A controller is electrically coupled to the current difference sensor, the current generator and at least one contactor. The controller operates at least one contactor.

In yet another form thereof, the invention comprises a method of ground fault protection including the steps of: generating a predetermined difference current with a current generator; providing the predetermined difference current to a current difference sensor; testing the current difference sensor; connecting an electrical load to a source of electrical power through the current difference sensor and at least one contactor; and determining if a ground fault exists in the electrical load.

An advantage of the present invention is that it automatically monitors ground fault apparatus.

Another advantage of the present invention is that it disables the ground fault apparatus and associated circuitry if the ground fault apparatus is determined to be defective.

Yet another advantage of the present invention is that it can provide ground fault equipment protection with a typical limit of 30 milliamperes, for example.

Yet another advantage of the present invention is that it can provide personnel protection with a ground fault interrupter circuit which has a limit of 6 milliamperes, for example.

Yet another advantage of the present invention is that it provides monitoring of the ground fault apparatus even if the equipment to be protected is not operating.

Yet another advantage of the present invention is that it does not require an operator to test the ground fault apparatus.

Yet another advantage of the present invention is that it tests the ground fault apparatus in a relatively continuous fashion.

BRIEF DESCRIPTION OF THE DRAWINGS

The above-mentioned and other features and advantages of this invention, and the manner of attaining them, will become more apparent and the invention will be better understood by reference to the following description of an embodiments of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
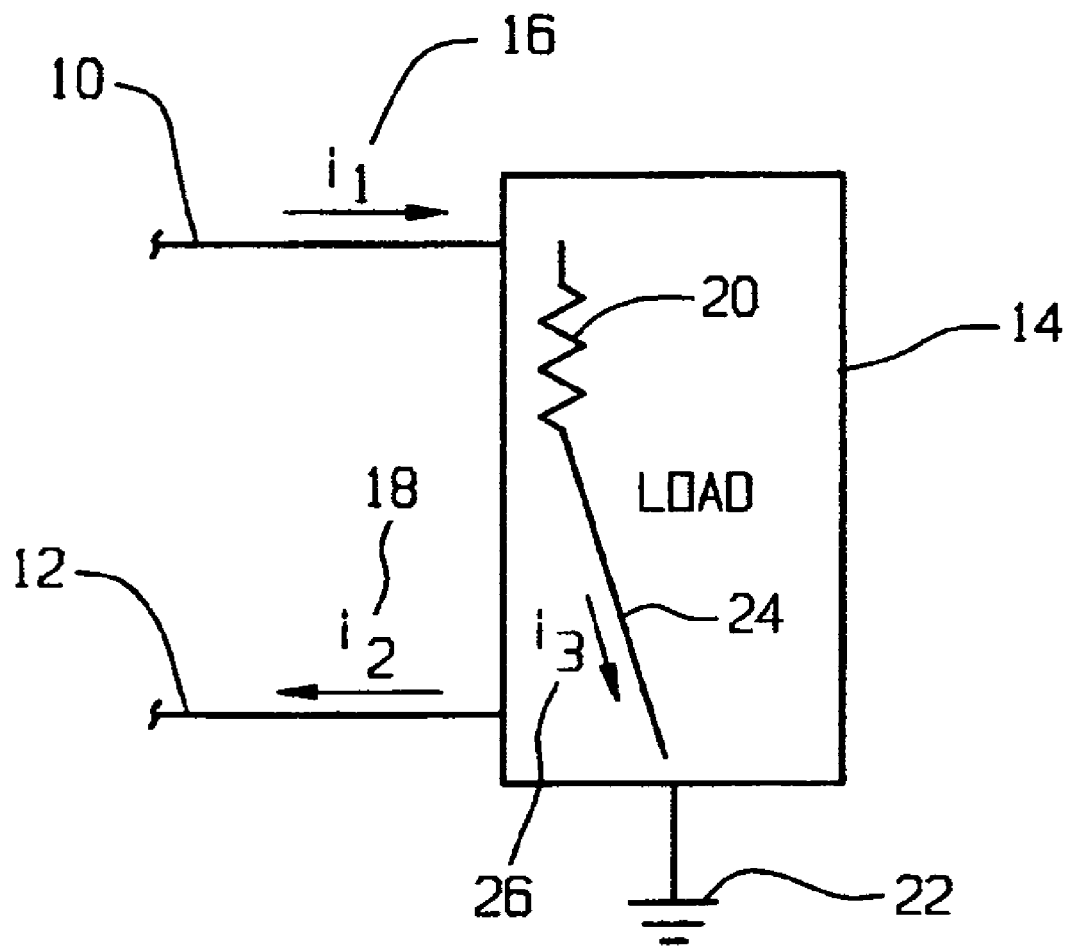
FIG. 1 is a schematic view which shows the origin of a ground fault current.

Referring now to the drawings, and more particularly to FIG. 1, there is shown an example of a ground fault which generally includes line (hot) conductor 10 and neutral conductor 12 connected to load 14. Conductors 10 and 12 are also connected to a source of electrical power (not shown).

Conductors 10 and 12 conduct load currents $i_1$ 16 to load 14 and current $i_2$ 18 from load 14. For example, if a defect in load 14's insulation system develops, this defect can be expressed as resistance 20 which connects conductor 10 to electrical ground 22 through conductive path 24. If $i_3$ 26 is the current (ground fault current) flowing through resistance 20, the equation below shows the relationship that exists between $i_1$ 16, $i_2$ 18 and $i_3$ 26.

$$i_3 = i_1 - i_2$$

For example, currents $i_1$ 16 and $i_2$ 18 can exceed 100 A while the typical maximum ground fault current $i_3$ 26 can be as small as 0.03 A or in other words 30 mA which is only 0.03 percent of the line current.

Figure 2:
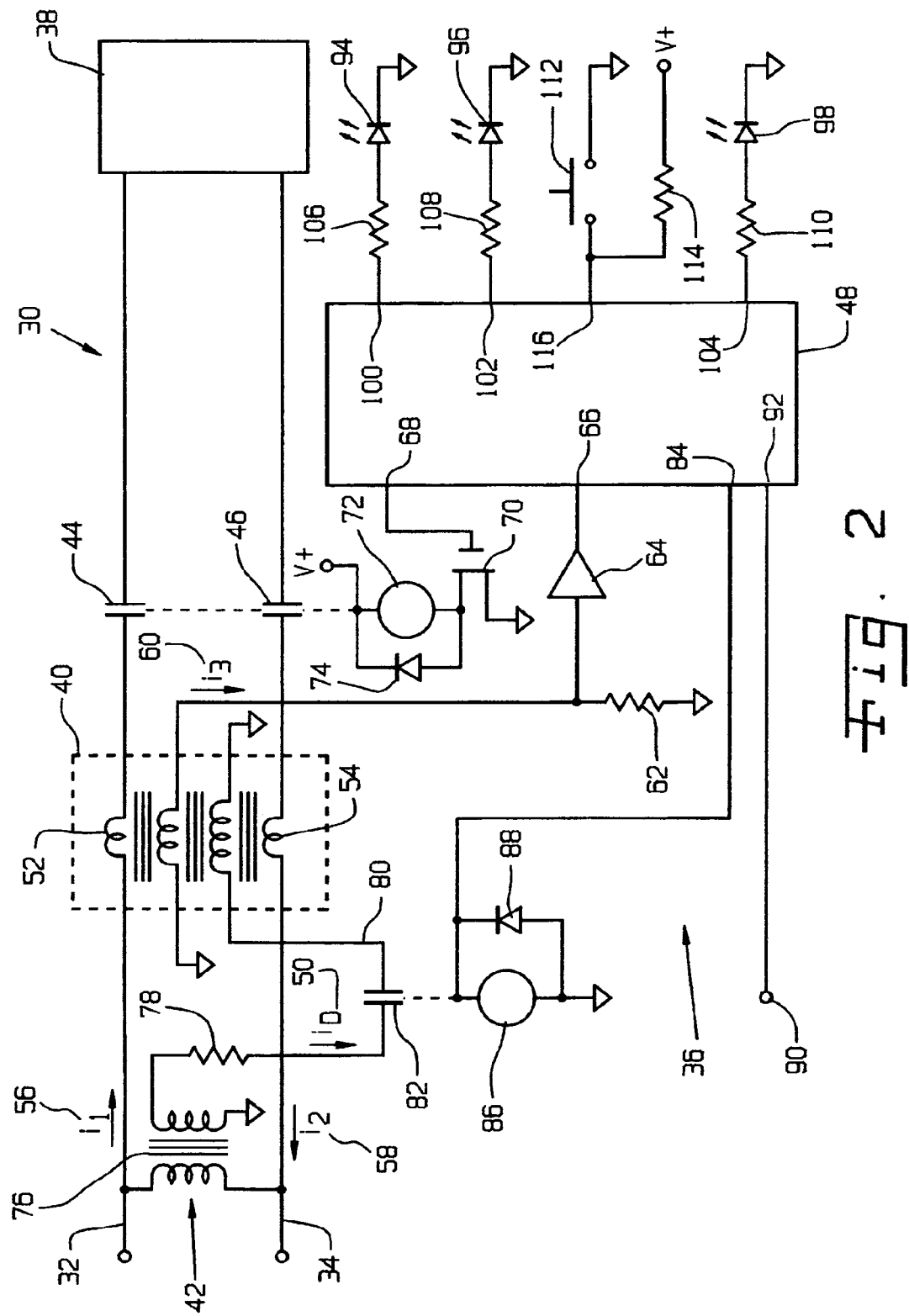
FIG. 2 is a schematic view of an embodiment of an electrical system of the present invention which shows an electronic circuit of the present invention.

Referring now to FIG. 2, there is shown an electrical circuit schematic for electrical system 30, which generally includes line (hot) conductor 32 and neutral conductor 34, approximately corresponding to conductors 10 and 12, respectively, in FIG. 1, configured for connection to a source of electrical power (not shown), ground fault interrupter 36 and an electrical load 38, approximately corresponding to load 14 in FIG. 1.

Electrical load 38 can be any electrical load that draws current through conductors 32, 34 from the source of electrical power (not shown).

Ground fault interrupter 36 generally includes a current difference sensor 40, a current generator 42 electrically coupled to current difference sensor 40, contactors 44, 46 electrically coupled to current difference sensor 40 and electrical load 38, and a controller 48 electrically coupled to current difference sensor 40, current generator 42, and contactors 44 and/or 46. Controller 48 operates contactors 44 and/or 46 through coil 72. Current generator provides a predetermined difference current $i_D$ 50 to current difference sensor 40. Controller 48 operates at least one contactor 44, 46 based on sensing at least predetermined difference current $i_D$ 50 at current difference sensor 40. Controller 48 can enable current generator 42. An absence of predetermined difference current $i_D$ 50, when controller 48 enables current generator 42, both disables at least one contactor 44, 46 and interlocks controller 48.

Current difference sensor 40 is shown as a current transformer. Conductors 32 and 34 are electrically coupled to the current transformer to single turn primary windings 52 and 54 respectively. Connecting these wires as shown ensures that line current $i_1$ 56 is subtracted from line current $i_2$ 58. Their difference is ground fault current $i_3$ 60. In the embodiment shown, needed accuracy of the current transformer requires shielding from stray electric and magnetic fields. Low magnetic core and copper winding losses are an additional requirement. A tape-wound toroidal core fabricated from a high permeability material is normally used. The flux density in the core is proportional to the instantaneous vector sum of the flux densities produced by the current carrying conductors passing through the core's window. The design of current transformer 40 must be such that variations in the orientation of the current carrying conductors passing through the core window do not cause error.

Ground fault current $i_3$ 60 passes through current shunt 62 thus developing a voltage proportional to current $i_3$ 60 which is applied to amplifier 64. The output of amplifier 64 is applied to one of A-D (analog to digital) inputs 66 on controller 48.

The normally open contactor contacts 44, 46 can apply or interrupt power applied to load 38 under control of controller 48. Controller 48 actuates the contactor by writing a '1' to output port 68. This causes a enhancement mode n-channel metal oxide field effect transistor (MOSFET) 70 to conduct current through the contactor's solenoid coil 72 thus causing the contacts 44 and 46 to close. Writing a '0' to output port 68 causes MOSFET 70 to cease conduction thus opening contacts 44 and 46. Diode 74 prevents a destructive voltage transient when MOSFET 70 ceases conduction.

Isolation transformer 76 is part of current generator 42 which is part of a self-check subsystem. The secondary winding voltage of isolation transformer 76 is divided by the value of current limiting resistor 78 to set the magnitude of predetermined difference current $i_D$ 50. Typically, the value of predetermined difference current $i_D$ 50 is set at a value near 30 mA for equipment protection or 6 mA for shock (personnel) protection. This current is intended to functionally test ground fault interrupter 36 ground fault detection capability. It is not intended for calibration purposes.

Predetermined difference current $i_D$ 50 is applied to current transformer 40 via a single conductor 80. Closing relay contact 82 applies predetermined difference current $i_D$ 50. Writing a '1' to controller output 84 causes current flow through relay coil 86 which closes its contact 82. Writing a '0' to output port 84 causes relay contact 82 to open. Diode 88 eliminates the potentially destructive voltage transient that could occur when this happens.

The external contactor enable logic signal 90, when '1', which is applied to controller 48 input 92 normally causes contactor 72 to operate thus applying voltage to load 38. Contactor 72 operation is inhibited if either a ground fault condition exists or a failure of ground fault interrupter 36 system has been detected.

Various LED (light emitting diode) indicators 94, 96, 98 show the status of the system. These are directly driven by the associated controller 48 I/O ports 100, 102, 104, respectively, through a current limiting resistors 106, 108, 110. LED 94 operates while voltage is applied to load 38. LED 96 operates if a ground fault condition has been asserted. LED 98 operates after a fault condition has been detected, that is, if the ground subsystem has failed.

Pushbutton switch 112, when operated, causes a ground fault test/reset cycle. The resistor 114 serves a pull-up function which generates a '1' at I/O port 116 with switch 112 open. Closing switch 112 contact generates a '0' which is the true condition for this signal.

Although contacts 44 and 46 are shown as being conductively coupled to load 38, contacts 44 and 46 can alternatively be inductively or radiantly coupled to load 38.

Controller 48 can be a Microchip Semiconductor, Inc. PIC18F819, or equivalent, for example. Microchip Semiconductor, Inc. PIC18F819 provides five analog to digital converter inputs along with logical I/O ports capable of sourcing or sinking 25 mA. Other features include Flash ROM and EEROM.

In use, the present invention provides a method of ground fault protection, including the steps of: generating predetermined difference current $i_D$ 50 with current generator 42; providing predetermined difference current $i_D$ 50 to current difference sensor 40; testing current difference sensor 40; connecting electrical load 38 to a source of electrical power through current difference sensor 40 and at least one contactor 44, 46; and determining if a ground fault $i_3$ 60 exists in electrical load 38. The method of the present invention can further includes the step of enabling current generator 42 with controller 48 connected to current difference sensor 40. The method can further include the step of operating at least one contactor 44, 46 with controller 48 based on sensing at least the predetermined difference current $i_D$ 50 at current difference sensor 40. Yet further, the present invention can include the steps of disabling at least one contactor 44, 46 and interlocking controller 48 if controller 48 does not sense predetermined difference current $i_D$ 50.

Many major functions are controlled by controller 48. Some of the hardware systems thus far described are peripherals that interface the controller with its environment. The ground fault interrupter described in this disclosure can be embedded in a system serving other purposes. Various temperature controls serve as excellent examples. Typical of these is the Environmental Technology, Inc. of South Bend, Ind. 46601 GPT-3 General Purpose Freeze Protection Thermostat.

Asserting a logical '1' on contactor enable signal line 90 causes contacts 44, 46 to close thus applying voltage to load 38 provided that the ground fault subsystem is operational and that there is not an unacknowledged ground fault condition. While either of these conditions exist, contacts 44, 46 are inhibited from closing. Indicator 94 operates while contacts 44, 46 are closed.

A signal proportional to ground fault current $i_3$ 60 is applied to A-D input 66. This signal is scaled and offset so that the voltage ratings of A-D input 66 is never exceeded. This signal is processed by controller 48 so as to extract the RMS (root mean square) value of its sinusoidal component. This value is compared to a constant value that is equivalent to 30 mA. If the RMS value exceeds 30 mA, a ground fault condition is declared. This inhibits the closure of the contacts 44, 46 which removes power from load 38 thus preventing an unsafe condition. While the ground fault condition remains unacknowledged, ground fault indicator 96 is operated. The existence of the ground fault condition is persistent until acknowledged even though power may be interrupted. Thus the flag representing the unacknowledged ground fault is stored in non-volatile RAM.

Although the exact time is not important, controller 48 provides an 8 hour self-test clock. The ground fault is tested on ticks of this clock providing that an unacknowledged ground fault is not pending.

Figure 3:
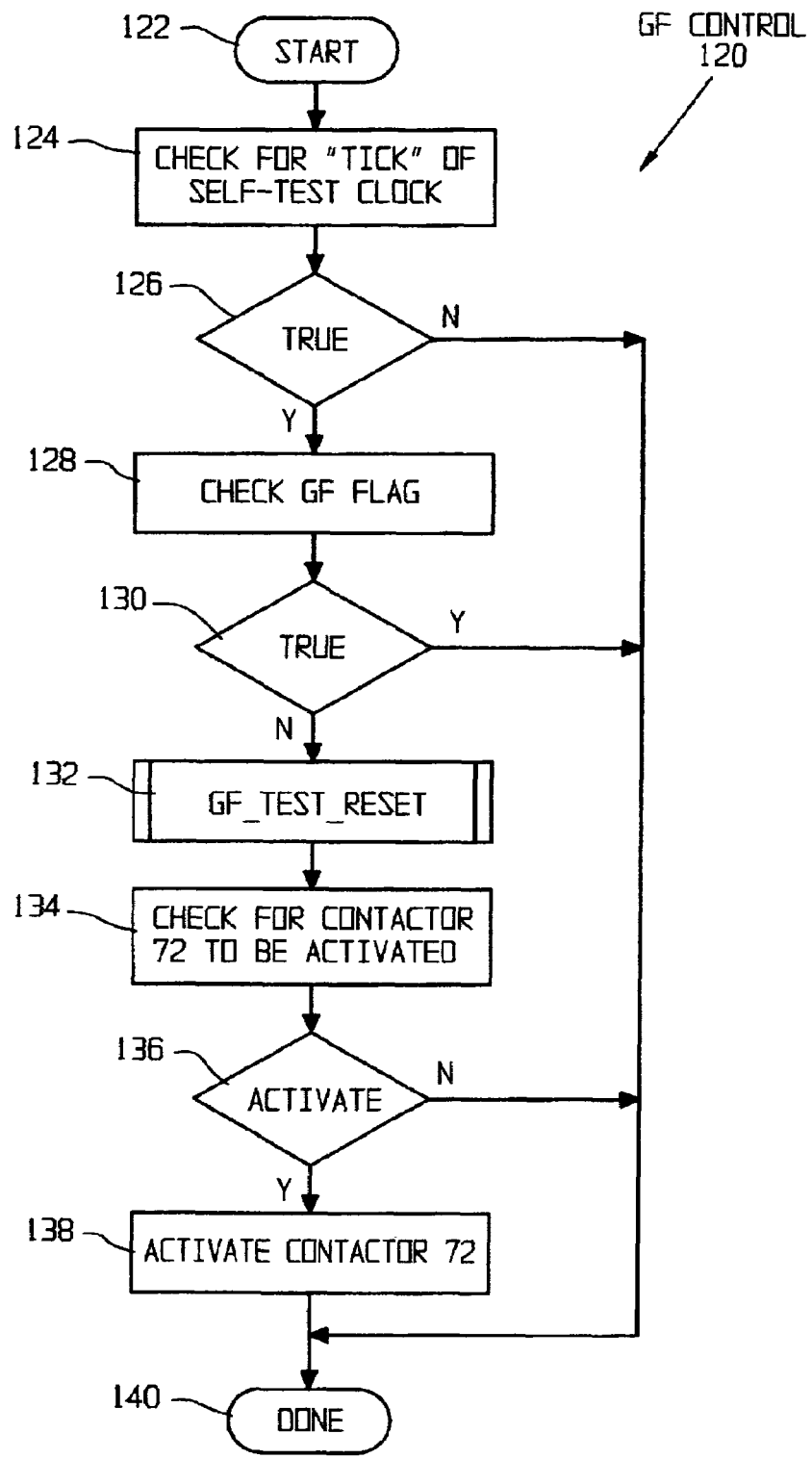
FIG. 3 is a flow chart which illustrates part of a logical operation of a ground fault control firmware implementing a primary function of the present invention.

Several times each second, the main program executes the procedure GF (ground fault) CONTROL 120, shown in FIG. 3, which tests the GF subsystem for functionality on ticks of the eight hour self-test clock. The ground fault (GF) subsystem can include, but is not limited to current generator 42 and current difference sensor 40, and generally, can include at least anything shown in FIG. 2 other than load 38. Execution of the procedure begins at terminus 122. Next, step 124 is executed to check for the occurrence of a tick of the self-test clock. If a tick is not detected in step 126 the procedure is exited at terminus 140 since no tasks remain.

If a clock tick has been detected in step 126, the GF flag is tested in step 128. The GF flag remains true during and after the GF condition until manually acknowledged. If the GF flag is true in step 130, the self-test cannot be performed since this causes an unsafe condition during testing. Hence no further action is required and an exit through terminus 140 is made.

If the GF flag is false in step 130 the GF TEST RESET procedure 132 is executed so as to test the GF subsystem functionality. Procedure 132 can be exited only if the GF subsystem is operational.

The next process performed in step 134 checks for a call for contactor 72 activation. Note that contactor 72 cannot activate unless the GF flag is false. If there is no call for contactor 72 in step 136, no further action is required so the procedure is exited through terminus 140.

Otherwise, the contactor 72 is actuated in step 138 and the process is exited through terminus 140.

Figure 4:
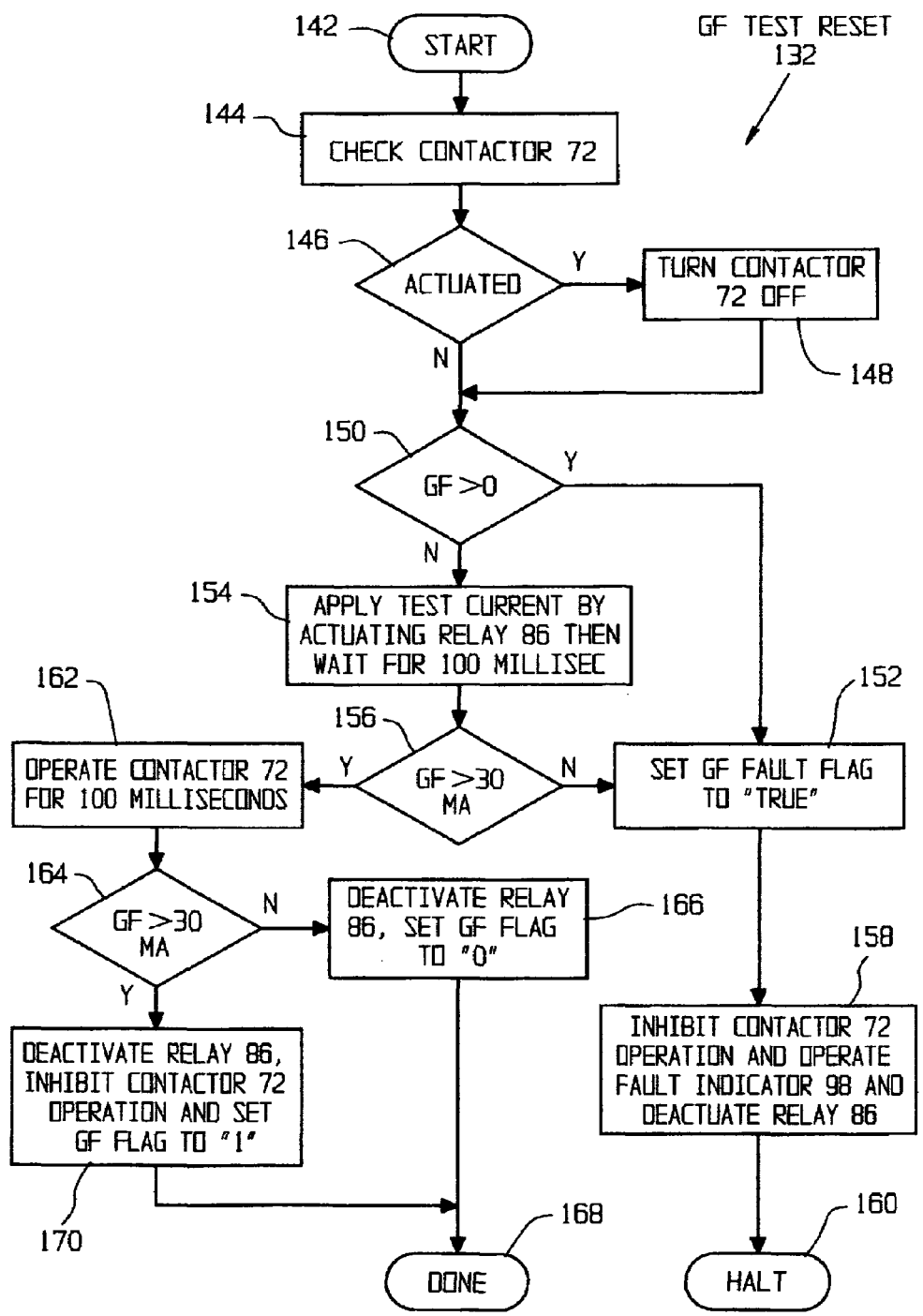
FIG. 4 is another flow chart which illustrates part of a logical operation of a ground fault test reset firmware implementing a primary function of the present invention.

FIG. 4 shows the procedure GF TEST RESET 132 in more detail. It is embedded in procedures for manual and automatic test of the GF test subsystem in addition to acknowledging a GF. Terminus 142 is the entry point for this procedure. The first task 144 is to check the contactor 72 to see if it is actuated. If it is as determined in step 146, it is turned off in step 148 so that the GF subsystem can be tested absent any potential ground fault current.

The GF current magnitude is checked at step 150. If it not essentially zero the GF subsystem has failed. This condition causes the GF flag to be set to its logical 'true' value in step 152. If the GF current magnitude is essentially zero in step 150, the GF test current is applied by actuating relay 86 and thereafter waiting for 100 milliseconds in step 154. If the GF current does not exceed 30 mA in step 156, the GF fault flag is set to its logical 'true' value in step 152. Thereafter, operation of the contactor 72 is inhibited in step 158, FAULT indicator 98 is operated and the test current is removed by de-actuating the relay 86. Operation of the system is now permanently halted in step 160 in order to prevent the potential shock and fire hazard the continued powering of the load 38 would cause. Since the fault condition is persistent, the fault flag is stored in EEROM. Controller 48 is one time programmable and there is no way of resetting the fault flag under program control. Thus, restoring normal operation requires replacing the controller 48.

If the GF current did exceed 30 mA in step 156, contactor 72 is operated for 100 milliseconds in step 162 to check that a ground fault condition has not developed in load 38. The GF current is once again checked in step 164. If the GF current does not exceed 30 mA, no ground fault exists. Thereafter, the GF flag is set to '0' in step 166 since there is no GF condition. The procedure is complete and an exit is made through terminus 168.

If the GF current exceeded 30 mA in step 164, a GF condition exists. Thereafter, the test current is removed by deactivating relay 86, setting the GF flag to '1' in step 170 and inhibiting the operation of contactor 72 thus preventing power from being applied to load 38 thus preserving system safety. Next, the procedure is exited through the input/output terminus 168 since its tasks are done.

Figure 5:
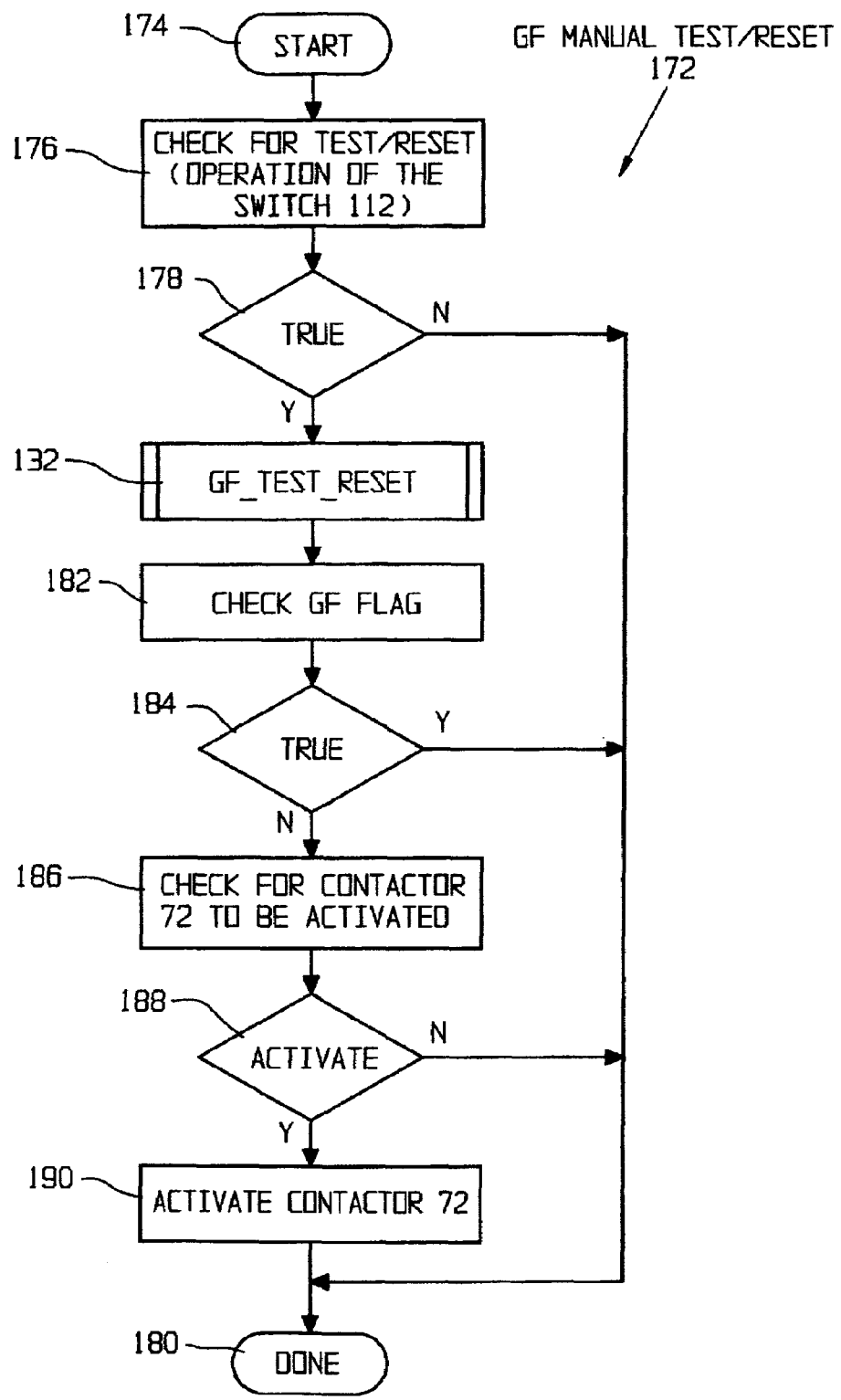
FIG. 5 is another flow chart which illustrates part of a logical operation of a ground fault manual test/reset firmware implementing a primary function of the present invention.

In FIG. 5, the procedure 172 of GF manual test/reset of the GF subsystem is described. This happens when an unacknowledged GF is acknowledged or the GF subsystem test is manually initiated. The flow chart showing how this is accomplished in firmware is shown in FIG. 5 which initiates with step 174.

The controller 48 checks the TEST/RESET switch 112 several times each second in step 176. Step 176 requires checking switch 112 to see if it is pressed. If it is not pressed as determined in step 178, the procedure is exited through terminus 180.

If switch 112 is pressed as determined in step 178, then process GF TEST RESET 132 is executed. The behavior of process 132 is described previously and its flow chart is shown in FIG. 4.

The completion of the procedure 132 is followed by step 182 in which the GF flag is tested. If the GF flag is true as determined in step 184, that is logical '1', a GF condition exists and no further action is required. Next, the procedure is exited through terminus 180.

If there is no GF condition as determined in step 184, a check is made to see if a call for contactor 72 activation is pending in step 186. If there is no call for activation as determined in step 188, the procedure is complete and an exit is made through terminus 180.

If there is a call for contactor operation pending as determined in step 188, step 190 requiring activation of contactor 72 is executed. Thereafter, an exit is made through terminus 180.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of ground fault protection, comprising the steps of:

generating automatically a predetermined difference current with a current generator at predetermined time intervals, said current generator including an isolation transformer;

providing said predetermined difference current to a current difference sensor;

enabling said current generator with a controller connected to said current difference sensor;

testing said current difference sensor;

connecting an electrical load to a source of electrical power through said current difference sensor and at least one contactor;

determining if a ground fault exists in said electrical load; and interlocking said controller if said controller does not sense said predetermined difference current.

2. The method of claim 1, further including the step of operating said at least one contactor with said controller based on sensing at least said predetermined difference current at said current difference sensor.

3. The method of claim 1, further including the steps of disabling at least one contactor if said controller does not sense said predetermined difference current.

4. The method of claim 1, further including the step of providing a pushbutton switch for selectively manually testing at least one of a ground fault test subsystem and for a ground fault condition, said controller configured for being interlocked if said controller does not sense said predetermined difference current during said selective manual testing.

* * * * *